3,048,631
NOVEL PHOSPHONITRILIC ISOTHIOCYANATE DERIVATIVES
Ludwig F. Audrieth, Urbana, Ill., and Rigobert J. A. Otto, Leverkusen-Koln, Germany, assignors to University of Illinois Foundation, Urbana, Ill., a corporation of Illinois
No Drawing. Filed June 23, 1959, Ser. No. 822,173
11 Claims. (Cl. 260—551)

This invention relates to products produced from phosphonitrilic isothiocyanates, and the preparation of same.

The phrases "phosphonitrilic isothiocyanate(s)" and "phosphonitrilic isothiocyanate product(s)" are herein intended to refer to chemical structures having a plurality of repeating $NP(NCS)_2$ groups or moieties linked to each other. Similarly, the phrases "phosphonitrilic chloride(s)" and "phosphonitrilic chloride products(s)" are intended to refer to products having a plurality of repeating $NPCl_2$ groups or moieties. Further, "available isothiocyanate" herein refers to halogenoid products containing pseudo-halogen groups or moieties that are capable of replacing the halogen atoms (e.g., chlorine atoms) of products such as phosphonitrilic chlorides, with $-N=C=S$ groups.

Many attempts have been made to replace the chlorine atoms of the phosphonitrilic or phosphonitrile chlorides e.g.,

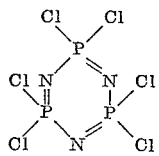

with other structural units in order to prepare derivatives which might be subjected to polymerization to yield elastomeric or polymeric products of greater or enhanced hydrolytic and thermal stability. For example, the chlorides tend to revert to low molecular weight forms during storage and are subject to attack by atmospheric moisture. Consequently, the commercial value of these phosphonitrilic chlorides has been seriously restricted because of their inherent chemical nature.

In an effort to produce phosphonitrilic products having greater stability, attempts have been made to replace the reactive chlorine atoms of phosphonitrilic chlorides with a wide variety of inorganic and organic groups. However, such efforts have not been very successful. For example, treatment of phosphonitrilic chlorides with ammonia produces a series of products known as phosphonitrilamides, which upon heating lose ammonia to form insoluble, infusible materials; these deammoniation products do not, however, possess the desired elastomeric characteristics. The reaction of the phosphonitrilic chlorides with various alcohols and amines produces products which have been reported to be capable of conversion into high molecular weight materials; however, the resulting products have not been reported to possess desirable characteristics. Further, despite the fact that the chlorine atoms of phosphonitrilic chlorides have been replaced by other halogen atoms such as fluorine and bromine, the stability characteristics of the polymeric materials produced therefrom are not greatly improved.

We have discovered that when the chlorine atoms of phosphonitrilic chlorides are replaced with pseudo-halogen radicals or moieties such as isothiocyanate groups (i.e., $-N=C=S$), new and useful phosphonitrilic isothiocyanate products are formed that may be used as intermediates or may be polymerized (e.g., in bulk or in solution) to elastomeric products having resistance to hydrolysis and thermal decomposition.

Phosphonitrilic isothiocyanate products, such as tri- and tetra-phosphonitrilic isothiocyanates (i.e.,

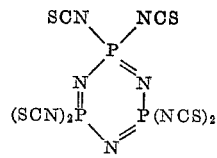

and

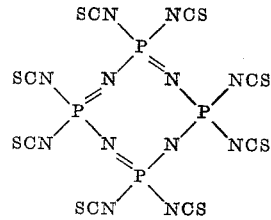

respectively) are remarkable materials. When these products are heated in a vacuum or even in contact with the air at temperatures above about 135° C., preferably above about 150° C., they polymerize to form elastomeric or rubber-like materials which possess considerable stability; polymerization may be conducted in bulk or in solution (e.g., mixed xylenes). When these products are melted between two plates of materials such as glass or aluminum and the specimens so prepared are heated in the temperature range of 150°–180° C. for several hours, the two plates adhere strongly to each other. Thus, we have discovered a method for replacing the chloro groups of phosphonitrilic chlorides with NCS groups. This substitution reaction also makes it possible, quite unexpectedly, to use relatively low temperatures to effect the polymerization of the phosphonitrilic isothiocyanates to form rubber-like material and products of enhanced stability. These products may be polymerized to form high molecular weight polymers having not more than about 10–15% by weight hot benzene-extractable material (e.g., low or nonpolymerized material). Still further, the presence of a plurality of isothiocyanate groups bonded to phosphorus atoms makes it possible to prepare a wide variety of adducts by reaction with such substances as ammonia, primary and secondary amines and polyamines, alcohols, polyethylene glycols and polyhydroxy compounds, mercaptans, hydrazine and hydroxylamine derivatives. The functional NCS groups are converted by such reactions into derivatives of thiourea, thiosemicarbazide, and related substances. Still further, phosphonitrilic isothiocyanates react with polyhydroxy compounds, polyamino compounds, and other substances containing a plurality of hydroxo and/or amino groupings; thus it has been found that a marked degree of fire retardness is exhibited by cellulose and cellulosic products when they are treated with phosphonitrilic isothiocyanates. For example, trimeric phosphonitrilic isothiocyanate may be dissolved in benzene, cotton fabric placed in the bath, the bath heated at reflux and held there for about an hour, and the fabric removed from the bath and dried. It has been still further noted that carbohydrate (e.g., starch) and protein (e.g., albumin) products are coagulated with phosphonitrilic isothiocyanates.

The presence in the phosphonitrilic isothiocyanates of a plurality of isothiocyanate groups bonded to phosphorus enables one to form adducts of phosphonitrilic isothiocyanates by an addition reaction which comprises reacting a phosphonitrilic isothiocyanate with selected materials or substances containing a reactive hydrogen atom bonded to an oxygen, nitrogen and sulfur, each of the latter atomic species representing a link between said reactive hydrogen and some other moiety such as an inorganic atom or inorganic or organic radical, whereby said hydrogen and connected member become bonded to the nitrogen atom and carbon atom, respectively, of at least one of the NCS groups of the phosphonitrilic isothiocyanate reactant, said nitrogen and carbon atoms being bonded to each other. More specifically, a phosphonitrilic isothiocyanate may be reacted with ammonia, primary and secondary aliphatic amines, aromatic amines, polyamines, alcohols, polyhydroxy compounds, mercaptans, and hydrazines. For example, adducts of phosphonitrilic isothiocyanates may be prepared by an addition reaction comprising reacting a phosphonitrilic isothiocyanate with substances such as illustrated by lower alkylene glycols, aniline, lower alkyl amines, lower alkyl alcohols, ammonia, lower alkyl mercaptans, poly-lower-alkylenepolyamines, and hydrazines.

The phosphonitrilic isothiocyanates may be prepared by reacting a phosphonitrilic chloride with available isothiocyanate, whereby the chlorine atoms of the phosphonitrilic chloride are replaced with isothiocyanate groups. The phosphonitrilic chloride may be a tri-, tetra-, penta-, hexa-, hepta-, or poly-phosphonitrilic chloride, or an admixture thereof.

In preparing these phosphonitrilic isothiocyanate products, inert (i.e., inert to the reaction mixture or components thereof), solvents should be used in which phosphonitrilic chlorides are soluble and stable and in which the halogenoid product provides available isothiocyanate (if an inorganic thiocyanate is used, it should be appreciably soluble in the solvent). The driving force of the reaction is characterized by precipitation of a chloride by-product. Phosphonitrilic chlorides are generally soluble in a wide variety of organic solvents. However, not all such solvents may be used since phosphonitrilic chlorides themselves contain active and labile chlorine atoms which undergo reaction with many organic solvents (e.g., those containing hydroxo and amido groups). A large number of solvents such as ketones (e.g., dialkyl ketones such as methyl ethyl ketone and cycloaliphatic ketones such as methyl cyclohexanone), nitriles (e.g., acetonitrile), and tertiary amines (e.g., pyridine), with some ethers (e.g., tetrahydrofuran) may be used as solvents for both the halogenoid source and phosphonitrilic halides; we have found that it is convenient to use inexpensive and readily available ketones (e.g., acetone) to produce the phosphonitrilic isothiocyanate products.

Alkali metal and alkaline earth metal thiocyanates (e.g., sodium potassium, calcium, and barium) and ammonium and N-substituted ammonium thiocyanates may be used to prodvide the available isothiocyanate groups. The chlorides of these particular groups and elemental species are relatively insoluble in a number of inert organic solvents in which the phosphonitrilic halides are soluble without reaction. Heavy metal (e.g., silver, lead and mercury) thiocyanates may also be used, but their comparatively low solubility requires that the reaction be permitted to take place over extended periods of time in order to effect formation of appreciable quantities of phosphonitrilic isothiocyanates.

We prefer to use alkali or metallic thiocyanates, potassium thiocyanate and ammonium thiocyanate in particular, to illustrate our method. When these thiocyanates are used, a solvent should be selected in which the thiocyanate is at least partially soluble.

Examples I and II, below, are intended to illustrate our method of preparing phosphonitrilic products.

*Example I*

A solution of 35 parts by weight of triphosphonitrilic chloride (i.e., (NPCl$_2$)$_3$) in 160 parts by weight of acetone was added slowly, with constant agitation, to a solution-slurry of 70 parts by weight of potassium thiocyanate in 160 parts by weight of acetone. Upon completion of this addition, the mixture was warmed for a few minutes and then filtered to remove the precipitated potassium chloride. The filtrate was cooled in a Dry Ice-acetone bath to effect crystallization of the product. The acetone solution was decanted and the crude product was recrystallized from n-heptane. A yield of 41 parts by weight of triphosphonitrilic hexa-isothiocyanate was produced. The product melted at 42° C.

*Analysis.*—Calcd. for P$_3$N$_3$(NCS)$_6$: C, 14.9%; N, 26.1%; P, 19.2%. Found: C, 15.3%; N, 25.8%; P, 19.8%.

The triphosphonitrilic hexa-isothiocyanate product of this example was found to be insoluble in water, but very soluble in acetone, benzene and ether. On heating at 150° C., it polymerizes to an elastomeric product that exhibits adhesive properties with aluminum or glass. It reacts with alcohols to give the corresponding O-alkyl thiocarbamido derivatives (e.g., P$_3$N$_3$(NHCSOR)$_6$, wherein R may be an aliphatic, aromatic, or cycloaliphatic group) with ammonia and amines to form thioureido and N-substituted thioureido products (e.g.,

P$_3$N$_3$(NHCSNH$_2$)$_6$, P$_3$N$_3$(NHCSNHR)$_6$ and

wherein R and R$_1$ are aliphatic, aromatic, or cycloaliphatic groups).

The triphosphonitrilic hexa-isothiocyanate may also be reacted with hydrazines, hydroxylamines and mercaptans to give the corresponding adducts. Furthermore, the product of this example may be reacted with a wide variety of polyhydroxy (e.g., ethylene glycol) and polyamino (e.g., diethylenetriamine and hexamethylene diamine) compounds to give high molecular weight products.

*Example II*

A solution of 47 parts by weight of tetrameric phosphonitrilic chloride (i.e., (NPCl$_2$)$_4$) in 280 parts by weight of acetone was added slowly, with constant agitation, to a solution-slurry of 79 parts by weight of potassium thiocyanate in 120 parts by weight of acetone.

During the addition, the temperature rose to the boiling point of acetone. After mixing was completed, the raection mixture was refluxed briefly, after which it was cooled to 0° C., and the precipitated potassium chloride together with the tetrameric isothiocyanate were removed by filtration. The precipitate was leached with water to remove soluble potassium chloride. Alternatively, the solid mixture may be extracted with hot n-heptane to dissolve the desired product. In either case, quantities corresponding to 56 parts by weight of the tetraphosphonitrilic octa-isothiocyanate are obtained.

The pure compound melted at 90° C. and differed from the trimeric compound described in Example I by being less soluble in acetone and other inert solvents.

*Analysis.*—Calcd. for P$_4$N$_4$(NCS)$_8$: C, 14.9%; N, 26.1%; P, 19.2%; S, 39.8%. Found: C, 15.2%; N, 25.9%; P, 19.5%; S, 40.2%.

The tetrameric product, like the trimeric isothiocyanate, reacts with ammonia, amines and poloyamines, with alcohol and poly-hydroxy compounds, with hydrazines, hydroxylamines, and mercaptans to yield the corresponding adducts. Further, it polymerizes, upon heating in vacuum above about 140° C. to form rubber-like polymers that exhibit adhesive properties for bonding glass surfaces to each other.

The following examples are intended to illustrate, but not limit, our method of preparing derivatives of phosphonitrilic isothiocyanates.

*Example III*

A solution containing 2 g. of triphosphonitrilic isothiocyanate (P$_3$N$_3$(NCS)$_6$) in 50 ml. of ether was added dropwise to about 50 ml. of liquid ammonia. A white precipitate was formed immediately which, however, redissolved in the excess of ammonia. The mixture was allowed to stand to permit evaporation of the excess of ammonia. A white solid was found to have separated in the residual ether solution and was separated by filtration. This product was redissolved in liquid ammonia and reprecipitated by reducing its solubility by addition to ether. The compound was recovered by filtration and dried under vacuum. It was found to decompose by heating to 190° C. The analysis of the compound corresponds with the formation of a hexa-thioureido derivative and was found to be very soluble in water and liquid ammonia and insoluble in acetone, benzene, ether and alcohol.

Analysis (percent).—Calcd. for $P_3N_3(NHCSNH_2)_6$: C, 12.3; H, 3.1; N, 35.9. Found: C, 12.4; H, 3.9; H, 34.9.

Two grams of the hexa-thioureido triphosphonitrile product were allowed to react with 10 ml. of a 36% water solution of formaldehyde. The compound dissolved initially, but soon thereafter a white precipitae began to separate from solution. This precipitate is insoluble in most common solvents; it was removed by filtration, washed with water and dried under vacuum at 100° C. Formation of an N-methylene thioureido derivative is suggested by the analytical results:

Analysis (percent).—Calcd. for $P_3N_3(NHCSNCH_2)_6$: C, 21.9; H, 2.7; N, 31.9. Found: C, 21.7; H, 3.3; H, 30.6.

*Example IV*

A solution of 4.8 g. (0.01 mole) triphosphonitrilic isothiocyanate in 100 ml. of benzene was treated with 5.6 g. (0.06 mole) of aniline. A white precipitate was immediately formed. After stirring for 30 minutes, the precipitate was filtered and washed with ether. The compound was then dried under vacuum and was found to melt at 151° C.

Analysis (percent).—Calcd. for $P_3N_3(NHCSNHC_6H_5)_6$: C, 48.4; H, 4.1; N, 20.2. Found: C, 48.9; H, 4.2; N, 19.6.

*Example V*

A solution of 4.8 g. (0.01 mole) of triphosphonitrilic isothiocyanate in 200 ml. of ether was treated with 4.4 g. (0.06 mole) of butylamine. A white precipitate was formed. After stirring for one hour, the precipitae was separated by filtration and was dissolved again in boiling acetone. By the addition of water, the compound was reprecipitated. The precipitate was dried under vacuum. A melting point of 155° C. was observed.

Analysis (percent).—Calcd. for $$P_3N_3(NHCSNHC_4H_9)_6$$

C, 38.7; H, 7.2; N, 22.8. Found: C, 38.8; H, 6.9; N, 22.3.

*Example VI*

A solution of 4.8 g. (0.01 mole) of triphosphonitrilic isothiocyanate in 200 ml. of ether was treated with 7.8 g. (0.06 mole) of di-n-butylamine. No precipitate was observed, but the solution became warm. The solution was left standing for 12 hours and then cooled but still no precipitation was observed. By evaporation of the ether solution, an oily material was obtained which was distilled under reduced pressure (0.005 mm. Hg) at 120–130° C. A yellow oil was recovered. The analytical results suggest the formation of an N-dibutyl thioureido compound.

Analysis (percent).—Calcd. for $$P_3N_3[NHCSN(C_4H_9)_2]_6$$

C, 51.5; H, 9.1; N, 16.7. Found: C, 49.9; H, 8.3; N, 15.4.

*Example VII*

Four and eight-tenths grams of triphosphonitrilic isothiocyanate (0.01 mole) were dissolved in 10 ml. of benzene and added to a solution of 7 g. (0.06 mole) of hexamethylene-diamine in 200 ml. of benzene, with stirring. A white precipitate was formed immediately. After one hour of stirring, the precipitate was separated by filtration and washed with benzene. The compound was found to be insoluble in all common solvents; further purification could not be effected. The compound does not melt, but decomposes at temperatures ranging between 200° C. and 260° C.

Analysis (percent).—Calcd. for $$P_3N_3[NHCSNH(CH_2)_6NH_2]_6$$

C, 42.8; H, 8.2; N, 24.9. Found: C, 41.6; H, 8.6; N, 24.1.

*Example VIII*

One-hundredth mole (4.8 g.) of triphosphonitrilic isothiocyanate was refluxed for two hours in 50 ml. of ethyl alcohol. A white precipitate was formed which was dissolved in boiling acetone. From this solution a white compound was recovered by crystallization. A melting point of 174° C. was observed.

Analysis (percent).—Calcd. for $$P_3N_3(NHCSOCH_2CH_3)_6$$

C, 28.4; H, 4.8; N, 16.6. Found: C, 28.5; H, 4.9; N, 17.0.

*Example IX*

Four and eight-tenths grams (0.01 mole) of triphosphonitrilic isothiocyanate were dissolved in 100 ml. of ether and 3.4 ml. of ethylene glycol were added. The mixture was refluxed for 24 hours. A hard white mass was obtained. The compound was dissolved in acetone and reprecipitated with ether. A white flaky compound was obtained which was separated by filtration. This compound was found to melt at 110° C. It is soluble in water, acetone, insoluble in benzene, ether. Analytical results are not satisfactory but suggest formation of an ethylene glycol reaction product.

Analysis (percent).—Calcd. for $$P_3N_3(NHCSOCH_2CH_2OH)_6$$

C, 25.3; H, 4.2; N, 14.7. Found: C, 23.7; H, 4.1; N, 18.0.

*Example X*

Four and eight-tenths grams (0.01 mole) of triphosphonitrilic isothiocyanate were dissolved in 50 ml. of ether and were added to a solution of 5.4 g. (0.06 mole) of butyl mercaptan in 100 ml. of ether. The solution was refluxed for six hours. No precipitation was observed. The solution was concentrated for removal of ether, leaving an oily residue. The latter was dissolved in 10 ml. of hot benzene. By cooling the solution to room temperature a white compound separated from solution. This compound was removed by filtration, washed with benzene and dried under vacuum. The product had a melting point of 135° C. Analytical results indicate that only a partial addition took place entailing only two of the isothiocyanate groups.

Analysis (percent).—Calcd. for $$P_3N_3(NCS)_4(NHCSSC_4H_9)_2$$

C, 25.3; H, 3.0; N, 19.0 Found: C, 26.20; H, 3.34; N, 19.04.

*Example XI*

A solution of 4.8 g. (0.01 mole) of $[NP(NCS)_2]_3$ in 100 ml. of dry ether was added to a solution of 7.1 g. (0.06 mole) plus 10% in excess of phenylhydrazine in 100 ml. of ether. The reaction was carried out in a three-necked round-bottom flask fitted with an inlet for dry argon, a sintered glass funnel and a separatory funnel for the addition of the phenylhydrazine solution.

The solution was stirred magnetically. The white precipitate which formed was separated by filtration through the sintered glass funnel which had previously been fitted to a neck of the flask. The precipitate was washed thoroughly with ether and dried under vacuum. The compound did not possess a definite melting point, but decomposes at approximately 165° C.

The compound was found to dissolve only in dioxane, but the solid could not be recrystallized from such a solution. The resulting solution changed rapidly from pale yellow to brown indicating that decomposition takes place under these circumstances.

*Analysis (percent).*—Calcd. for $$N_3P_3(NHCSNHNH\phi)_6$$

C, 44.6; H, 4.3; N, 26.0. Found: C, 45.1; H, 4.6; N, 25.8.

Example XII

A solution of 6.4 g. (0.01 mole) of $[NP(NCS)_3]_4$ in 50 ml. of ether was added with stirring to a solution of 6.4 g. (0.08 mole plus 10% of excess) of n-butylamine dissolved in 100 ml. of ether. The mixture was allowed to stand for 30 minutes at room temperature. It was then extracted repeatedly with 0.1 N aqueous HCl until the excess of n-butylamine had been removed completely. The ether solution was washed with water and dried over anhydrous $Na_2SO_4$.

The solution was concentrated under vacuum and cooled to —80° C. A small amount of a white crystalline compound was recovered which had a melting point of 105° C. This compound was found to be soluble in ether, benzene, petroleum ether, and carbon tetrachloride.

*Analysis (percent).*—Calcd. for $N_4P_4(NHCSNHBu)_8$: C, 39.0; H, 7.4; N, 22.8. Found: C, 39.4; H, 7.1; N, 23.2.

In another experiment using the same amounts of reactants, the ether solution, after washing with 0.1 N HCl and water, was dried with anhydrous $Na_2SO_4$ and then refluxed for 4 hours. A white precipitate was formed which was separated by filtration and dried under vacuum. The melting point was found to be 155° C. Analysis was found to correspond to the addition of 6 moles of $BuNH_2$ to one mole of $[NP(NCS)_2]_4$.

*Analysis (percent).*—Calcd. for $$[NP(NCS)_2]_4 \cdot 6BuNH_2$$

C, 35.6; H, 6.3; N, 23.2. Found: C, 36.1; H, 6.0; N, 22.9.

The molecular weight of this product was determined using the Rast procedure. Calcd. for $$[NP(NCS)_2]_4 \cdot 6C_4H_9NH_2$$

1105. Found: 1044.

Example XIII

A cold solution of 1.61 g. (0.0025 mole) of tetraphosphonitrilic isothiocyanate in 200 ml. of ether was added to a solution of 20 g. (excess) of liquid ammonia in 100 ml. ether. The mixture was allowed to stand to permit evaporation of excess ammonia. The white, spongy mass which had formed was separated from the solution by filtration. It was redissolved in a liquid ammonia-ether solution and was purified by repetition of the above procedure. The product does not melt, but decomposes between 115–120° C. It is hygroscopic, very soluble in water, insoluble in alcohol, acetone, ether and benzene.

*Analysis (percent).*—Calcd. for $P_4N_4(NHCSNH_2)_8$: C, 12.3; H, 3.1; N, 35.9. Found: C, 12.5; H, 3.7; N, 36.0.

The same compound was obtained by adding excess liquid ammonia to a solution of tetraphosphonitrilic isothiocyanate in ether. The white precipitate first formed dissolves in excess ammonia. By allowing the excess of ammonia to evaporate the white ammonia derivative was again obtained.

If just enough ammonia is added to the solution of tetraphosphonitrilic isothiocyanate in ether for complete precipitation, a white product can be separated by filtration. If this substance is dissolved in the liquid ammonia-ether solution, the thioureido derivative is again obtained. However, the white intermediate product that was first formed by the precipitation when ammonia was added to an ether solution of tetraphosphonitrilic isothiocyanate differed in composition from the material prepared initially. It was unstable, decomposing when allowed to stand to give ammonia and hydrogen sulfide. It did not melt, but decomposed above 170° C.

*Analysis (percent).*—Calcd, for $P_4N_4(NHCS)_8(NH)_4$: C, 13.5; H, 1.7; N, 31.5. Found: C, 13.2; H, 3.8; N, 32.8.

Example XIV

Three grams (0.0465 mole) of tetraphosphonitrilic isothiocyanate were refluxed with 50 ml. (1.09 mole) of absolute ethyl alcohol for 30 minutes on a steam bath. The clear solution was cooled to 0° C. in an ice bath. A white product began to separate. On standing at 0° C. for three hours, a heavy, crystalline, white compound, presumably $P_4N_4(NHCSOC_2H_5)_8$, separated from the solution. It was filtered, washed with cold alcohol and dried. An additional amount of the same material was obtained by concentrating the filtrate to half of its volume. The product was recrystallized from alcohol, M.P. 189° C. The yield was 3.6 g. (76%). It is soluble in alcohol and acetone, but insoluble in water, benzene and ether.

*Analysis (percent).*—Calcd. for $$P_4N_4[NH \cdot CS(OC_2H_5)]_8$$

C, 28.4; H, 4.8; N, 16.6. Found: C, 28.4; H, 4.7; N, 17.3.

Example XV

A solution of 3.22 g. (0.005 mole) of tetraphosphonitrilic isothiocyanate in 25 ml. of benzene were added dropwise to a solution of 3.8 g. (0.41 mole) of aniline in 25 ml. of benzene. The resulting white product was filtered, washed with benzene and dried. It was recrystallized from ethanol. The melting point of the pure product is 139° C. The yield was 6.5 g. (93.5%). It is soluble in alcohol and acetone, sparingly soluble in benzene, and insoluble in water, ether, carbon disulfide and carbon tetrachloride.

*Analysis (percent).*—Calcd. for $$P_4N_4[NH \cdot CS(NHC_6H_5)]_8$$

C, 48.4; H, 4.1; N, 20.2. Found: C, 48.2; H, 4.2; N, 20.3.

Example XVI

A solution of 4.32 g. (0.40 mole) of redistilled phenyl hydrazine in 50 ml. benzene was added dropwise to a solution containing 3.22 g. (0.005 mole) of tetraphosphonitrilic isothocyanate in 50 ml. benzene. The resulting white product was separated by filtration, washed with benzene and dried. It was recrystallized by dissolving it in absolute alcohol and precipitating it by addition of benzene. It does not melt but foams with decomposition at 135° C. The yield was 7.4 g. (98%). It is soluble in alcohol and acetone, and insoluble in water, benzene and ether. Analytical results suggest the formation of the N-phenyl thiosemicarbazido derivative.

*Analysis (percent).*—Calcd. for $$P_4N_4(NHCSN_2H_2C_6H_5)_8$$

C, 44.6; H, 4.3; N, 26.0. Found: C, 43.1; H, 4.8; N, 24.8.

Example XVII

A solution containing 6.44 g. of tetraphosphonitrilic isothiocyanate (0.01 mole) in 100 ml. benzene was added dropwise with agitation to a solution containing 10 g. of hexamethylenediamine (0.0832 mole). A white product separated from solution; it was washed thoroughly with benzene and dried. It does not melt but decomposes slowly turning yellow, brown, then dark brown at 230° C. The yield was 15.72 g. The product was insoluble in water, alcohol, acetone, benzene and ether.

*Analysis (percent).*—Calcd. for $$P_4N_4[NH \cdot CS(NH \cdot C_6H_{12}NH_2)]_8$$

C, 42.8; H, 8.2; N, 24.9. Found: C, 41.02; H, 7.63; N, 24.93.

Analytical results again suggest the formation of a thioruea-type product.

*Example XVIII*

A solution containing 3.22 g. (0.005 mole) of tetraphosphonitrilic isothiocyanate in 50 ml. benzene was added dropwise to a solution of 10 g. (0.097 mole) of diethylenetriamine in 50 ml. benzene. The white product was filtered, washed with benzene and dried. It decomposes at 140–149° C. The yield was 7.36 g. The product was insoluble in water, alcohol, acetone, benzene and ether. It is soluble in diethylenetriamine with decomposition.

*Analysis (percent).*—Calcd. for $$P_4N_4(NHCSNHC_2H_4NHC_2H_4NH_2)_8$$

C, 32.7; H, 7.1; N, 34.3. Found: C, 33.8; H, 7.5; N, 34.6.

Analytical results again suggest the formation of a thiouera-type product.

This application is a continuation-in-part of our presently pending application Ser. No. 805,736, filed April 13, 1959.

The foregoing detailed description has been given for clearness of understanding only, and no unnecessary limitations should be understood therefrom, as modifications will be obvious to those skilled in the art.

We claim:

1. Adducts of phosphonitrilic isothiocyanate having at least three repeating $[NP(Q_1)(Q_2)]$ groups wherein (a) $Q_1$ is

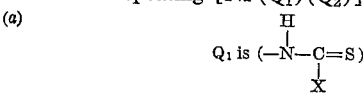

and X thereof is a member selected from the group consisting of

—NH—NH$_2$, —NH$\phi_1$, —NH$_2$, NH—R$_3$,

—NH—NH$\phi_2$,

—NH—R$_4$—NH—R$_4$—NH$_2$, —NH—R$_5$—NH$_2$,

—O—R$_6$, O—R$_7$, —S—R$_8$, wherein R$_1$ is a member of the group consisting of hydrogen and a lower alkyl, R$_2$ is a member of the group consisting of a lower alkyl and a lower alkylamino, $\phi_1$ is phenyl, R$_3$ is lower alkyl, $\phi_2$ is phenyl, R$_4$ is a lower alkylene, R$_5$ is a lower alkylene, R$_6$ is a lower alkyl, R$_7$ is a lower alkyl alcohol, and R$_8$ is a lower alkyl, and (b) Q$_2$ is a member of the group consisting of Q$_1$ and (—N=C=S).

2. The product of claim 1 wherein X is —NH$_2$.
3. The product of claim 1 wherein X is

R$_1$ is hydrogen, and R$_2$ is a lower alkyl substituent.

4. The product of claim 1 wherein R$_1$ is hydrogen and R$_2$ is a lower alkylamino substituent.
5. The product of claim 1 wherein R$_1$ is a lower alkyl substituent and R$_2$ is a lower alkyl substituent.
6. The product of claim 1 wherein X is —NH—NH$_2$.
7. The product of claim 1 wherein X is —NH—NH$\phi_2$ and $\phi_2$ is phenyl.
8. The product of claim 1 wherein X is —NH$\phi_1$ and $\phi_1$ is phenyl.
9. The product of claim 1 wherein X is —O—R$_6$, wherein R$_6$ is a lower alkyl substituent.
10. The product of claim 1 wherein X is —S—R$_8$, wherein R$_8$ is a lower alkyl substituent.
11. The product of claim 1 consisting of more than two but less than five repeating $[NP(Q_1)(Q_2)]$ groups.

References Cited in the file of this patent

Hover: J. American Chem. Soc., volume 78, pages 842–843 (1956).

UNITED STATES PATENT OFFICE
CERTIFICATE OF CORRECTION

Patent No. 3,048,631  August 7, 1962

Ludwig F. Audrieth et al.

It is hereby certified that error appears in the above numbered patent requiring correction and that the said Letters Patent should read as corrected below.

Column 2, lines 11 to 19, the formula should appear as shown below instead of as in the patent:

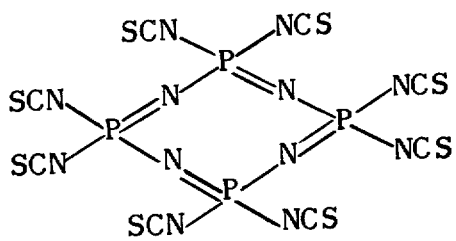

column 4, line 46, for "raection" read -- reaction --; line 62, for "poloyamines" read -- polyamines --; column 5, line 17, for "H, 34.9" read -- N, 34.9 --; line 21, for "precipitae" read -- precipitate --; line 28, for "H, 30.6" read -- N, 30.6 --; line 45, for "precipitae" read -- precipitate --; column 6, line 25, for "Example-IX", in italics, read -- Example IX --, in italics; line 60, after "N, 19.0" insert a period; line 66, for "phenyhydrazine" read -- phenylhydrazine --; column 10, line 1, for "NH-$R_3$" read -- -NH-$R_3$ --; line 5, for "O-$R_7$" read -- -O-$R_7$ --.

Signed and sealed this 29th day of October 1963.

(SEAL)
Attest:

ERNEST W. SWIDER
Attesting Officer

EDWIN L. REYNOLDS
Acting Commissioner of Patents